(12) United States Patent
Lazzari

(10) Patent No.: US 6,760,950 B2
(45) Date of Patent: Jul. 13, 2004

(54) OUTER REAR MIRROR FOR TRUCKS AND MOTOR VEHICLES IN GENERAL INCLUDING AN AUTOMATIC CLEANING DEVICE

(76) Inventor: Ivo Lazzari, Via Donizetti, 7, 20095, Cusano Milanini (IT)

( * ) Notice: Subject to any disclaimer, the term of this patent is extended or adjusted under 35 U.S.C. 154(b) by 509 days.

(21) Appl. No.: 09/789,041

(22) Filed: Feb. 20, 2001

(65) Prior Publication Data

US 2002/0038487 A1 Apr. 4, 2002

(30) Foreign Application Priority Data

Oct. 4, 2000 (IT) ...................................... MI2000A2150

(51) Int. Cl.$^7$ ............................... B60S 1/60; B60S 1/56

(52) U.S. Cl. ............................. 15/250.003; 15/250.15; 15/250.22; 15/250.31

(58) Field of Search ...................... 15/250.002, 250.003, 15/250.15, 250.22, 250.3, 250.31

(56) References Cited

U.S. PATENT DOCUMENTS

| | | | | |
|---|---|---|---|---|
| 2,944,277 A | * | 7/1960 | Ochello et al. | |
| 3,832,750 A | * | 9/1974 | Jarvinen et al. | |
| 3,840,934 A | * | 10/1974 | Bird | |
| 3,940,822 A | * | 3/1976 | Emerick et al. | |
| 4,320,554 A | * | 3/1982 | Tamura et al. | |
| 5,426,813 A | * | 6/1995 | Miki et al. | |
| 5,634,234 A | * | 6/1997 | Allain | |

* cited by examiner

Primary Examiner—Terrence R. Till
(74) Attorney, Agent, or Firm—Hedman & Costigan, P.C.

(57) ABSTRACT

An outer rear mirror for trucks and motor vehicles in general, provided with an automatic cleaning device, comprises an electric motor rotatively driving an endless worm, meshing with a gear wheel rigid with an elliptical cross-section element turning about a rotary shaft in turn supporting a cam member including a peripheral groove in which is engaged a drive bearing coupled to a telescopic rod sliding in a hollow cylinder, the outer rear mirror further including one or more mirror-like surface having different geometrical-optical characteristics, and a rear frame having a metal flange clamping member.

22 Claims, 5 Drawing Sheets

OUTER REAR MIRROR FOR TRUCKS AND MOTOR VEHICLES IN GENERAL INCLUDING AN AUTOMATIC CLEANING DEVICE

BACKGROUND OF THE INVENTION

The present invention relates to an outer rear mirror for trucks and motor vehicles in general, the rear mirror including a cleaning device for automatically cleaning said rear mirrors.

As is known, a very important problem in the truck and motor vehicle field is that of properly continuously cleaning the rear mirrors of the trucks and motor vehicles.

Actually, under adverse meteorological conditions, such as in snow, powder, mud, mist conditions and the like, the mirrors are soiled, thereby preventing the motor vehicle driver from properly seen the outside objects.

At present prior mirrors are exclusively manually cleaned.

This cleaning operation, on the other hand, requires a lot of time and cannot be performed during the driving of the motor vehicle: accordingly, the driver must stop his/her vehicle to properly clean the rear mirrors to prevent serious road accidents from occurring.

SUMMARY OF THE INVENTION

Accordingly, the aim of the present invention is to provide an outer rear mirror including a cleaning device specifically designed for automatically cleaning the mirror.

Within the scope of the above mentioned aim, a main object of the present invention is to provide an outer rear mirror including an automatic cleaning device of electro-mechanic type suitable to properly clean the mirror even the latter is of a type including two rear mirror like members having different optical characteristics.

Another object of the present invention is to provide such a rear mirror including an electric motor rotatively driving a worm meshing with a gear wheel in turn driving one or more cleaning brushes through kinetic driving means.

Yet another object of the present invention is to provide such a rear mirror, including an automatic cleaning device, which is very reliable and safe in operation and which, moreover, is very competitive from a mere economic standpoint.

According to one aspect of the present invention, the above mentioned aim and objects, as well as yet other objects, which will become more apparent hereinafter, are achieved by an outer rear mirror for trucks and motor vehicles in general, including a cleaning device therefor, according to the accompanying claims.

BRIEF DESCRIPTION OF THE DRAWINGS

Further characteristics and advantages of the present invention will become more apparent hereinafter from the following detailed disclosure of a preferred embodiment thereof which is illustrated, by way of an indicative, but not limitative example, in the accompanying drawings, where.

DESCRIPTION OF THE PREFERRED EMBODIMENTS

Figure 1:
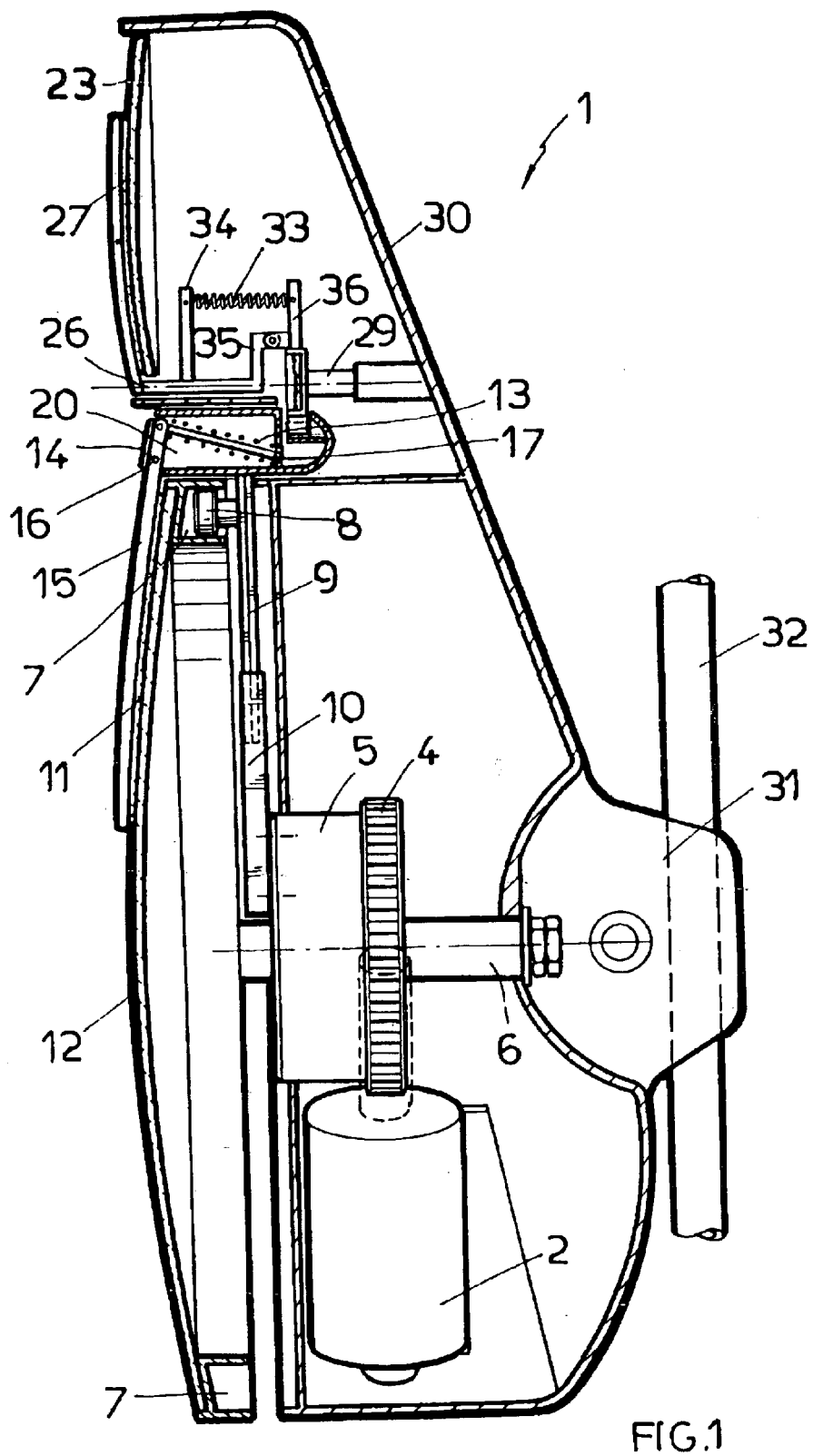
FIG. 1 is cross-sectional view of the outer rear mirror according to the present invention.
Figure 2:
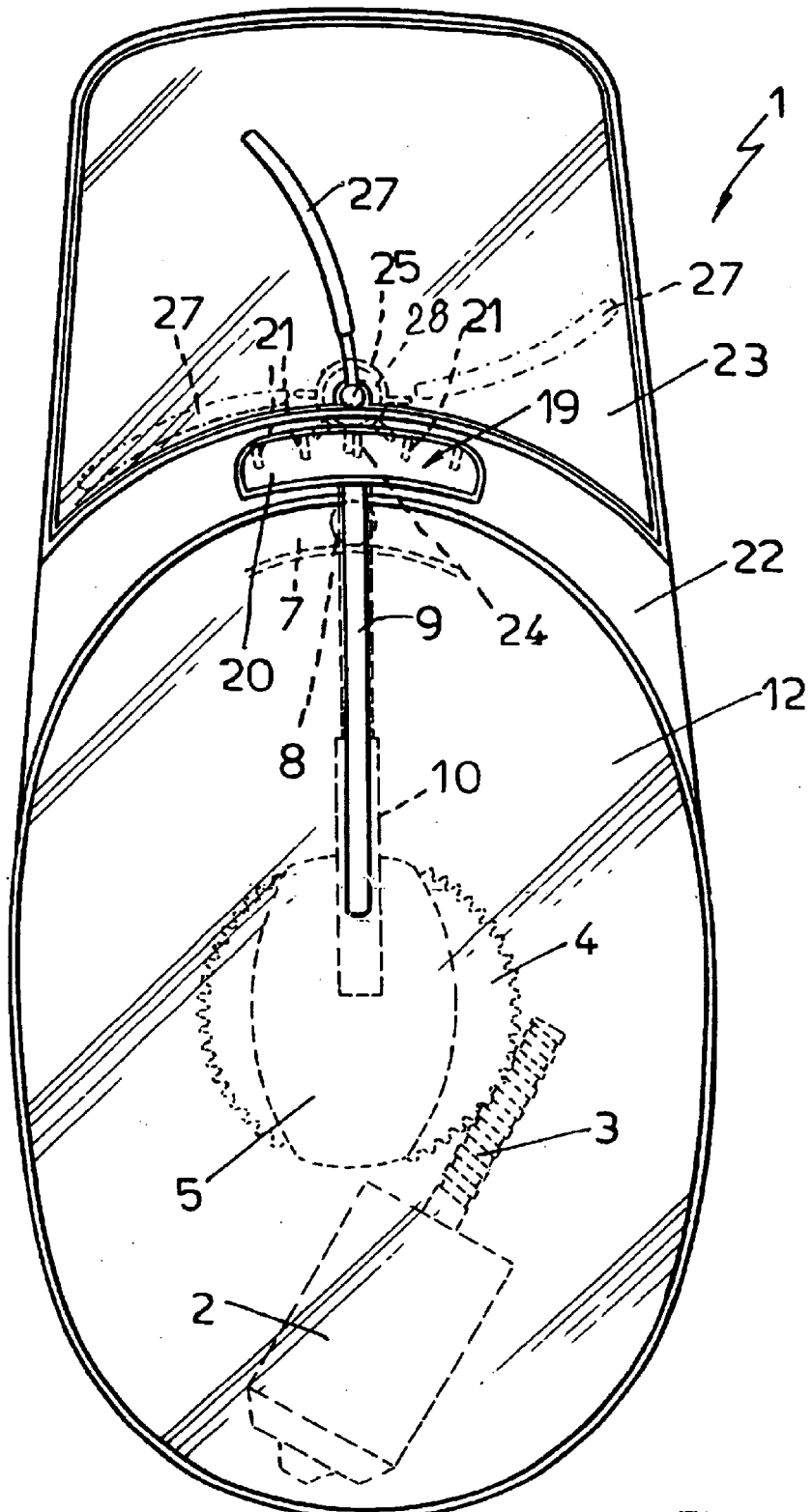
FIG. 2 is a front view of the rear mirror according to the present invention.
Figure 3:
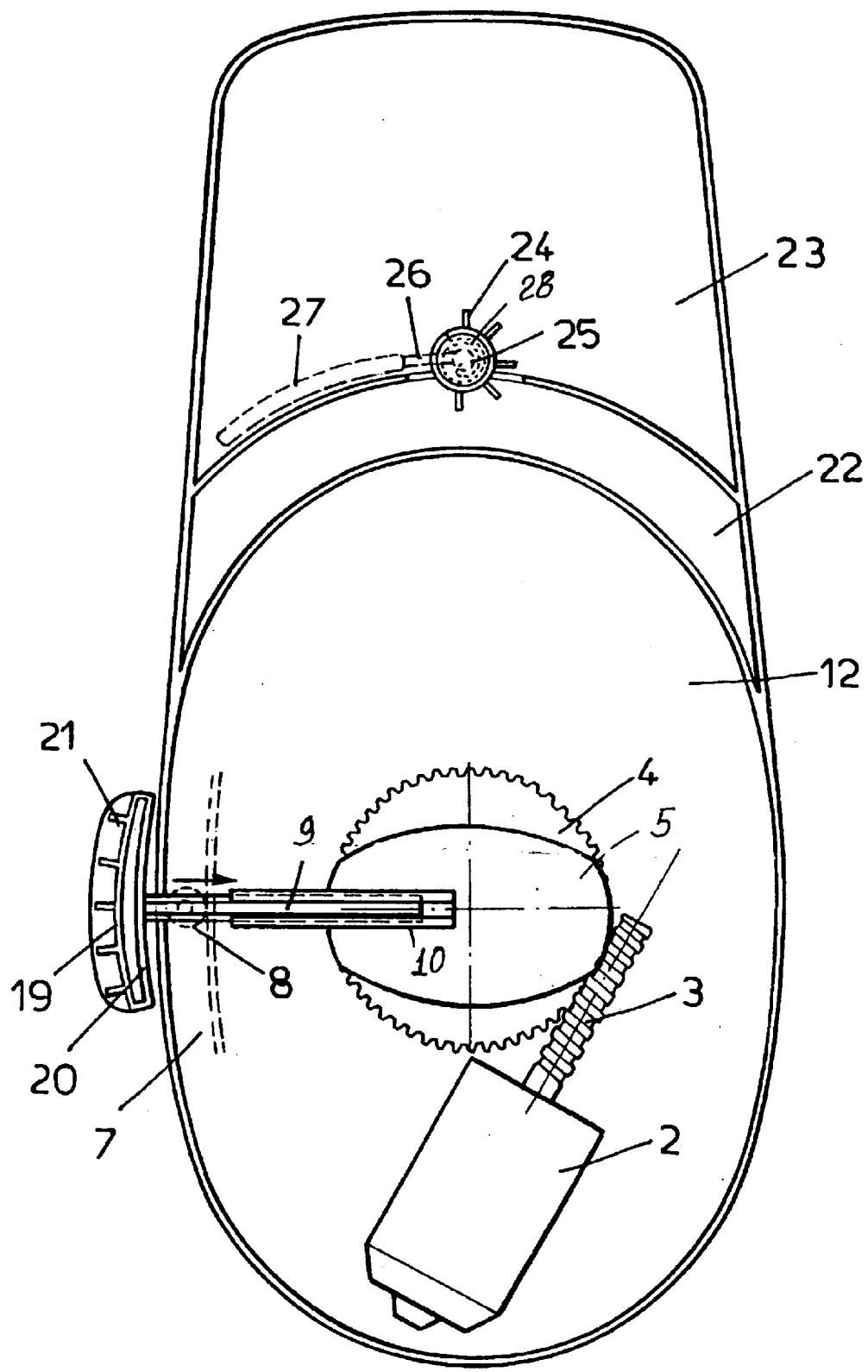
FIG. 3 is a further cross-sectional view of the rear mirror according to the present invention.
Figure 4:
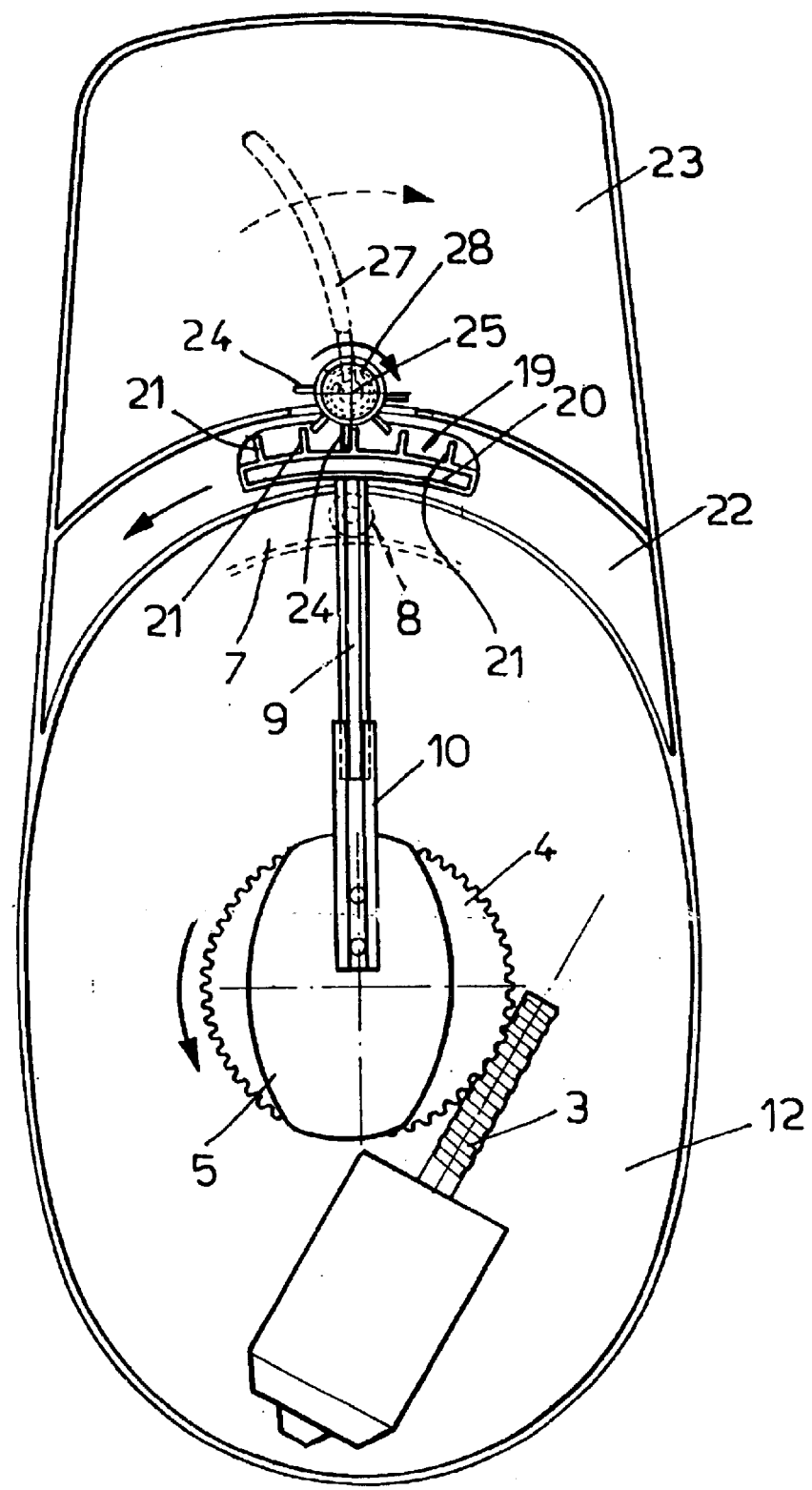
FIG. 4 illustrates the rear mirror of FIG. 3 in an operating position thereof.
Figure 5:
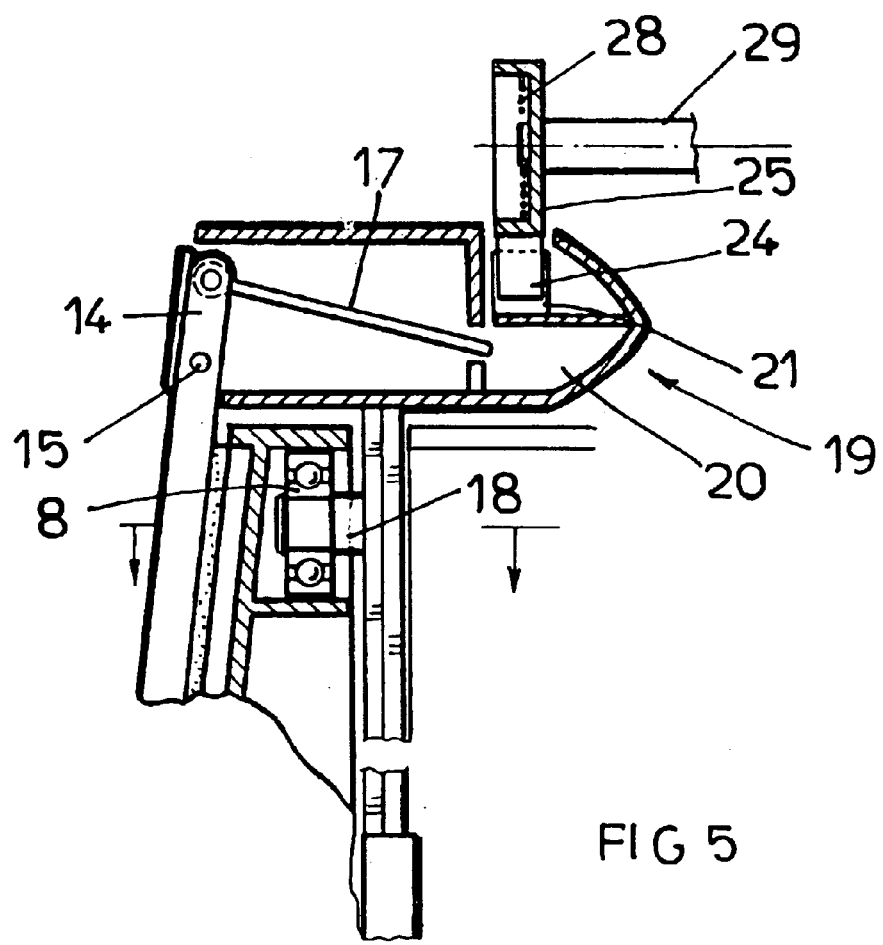
FIG. 5 is a further cross-sectional view illustrating a detail of the rear mirror according to the invention.
Figure 6:
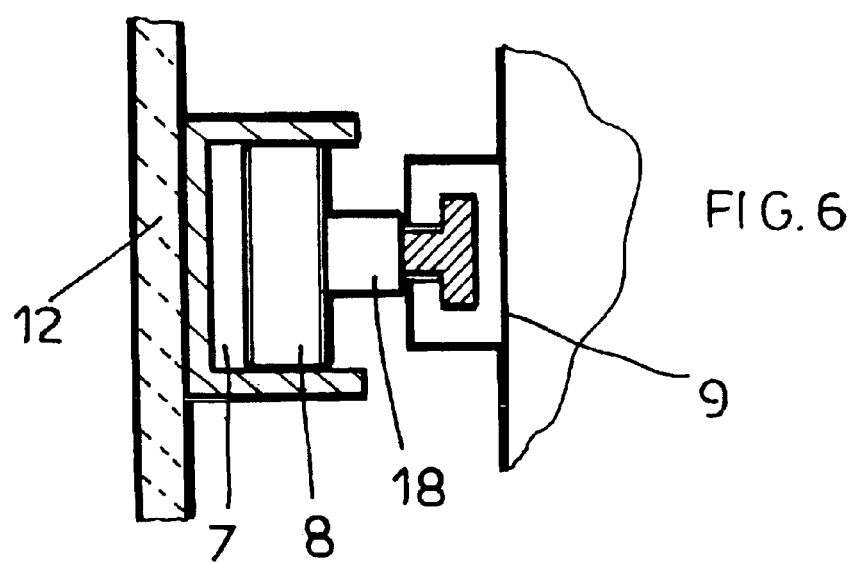
FIG. 6 is a side cross-sectional view of a portion of the mirror, showing a cam and a guiding roller sliding therein.

With reference to the number references of the above mentioned figures, the outer rear mirror for trucks and motor vehicles in general, which has been generally indicated by the reference number 1, includes therein a cleaning device for automatically cleaning said mirror.

In particular, said cleaning device comprises an electric motor 2, rotatively driving an endless worm 3, meshing with a gear wheel 4.

The latter is rigid with an elliptical cross-sectional element 5, turning about a rotary shaft 6, in turn supporting a cam 7 housing a guide or drive bearing 8 therein, said bearing 8 being coupled to a telescopic rod 9 designed for sliding within a cylinder 10.

The telescopic rod 9, in particular, performs a rotary movement and entrains therewith a brush 11, which is so driven as to contact the surface of the bottom portion 12 of the rear mirror 1, thereby properly cleaning it.

As shown, the mirror cleaning brush 11 is held in contact with the surface of the mirror bottom portion 12 by a spring 13, designed for pressing an end 14 of an arm 15 supporting the brush 11.

The arm 15 is pivoted on a pivot pin 16.

The spring 13 is coiled about a guide rod 17.

Thus, as the motor 2 is energized, it will rotatively drive, through the worm 3, the gear wheel 4 and cylinder 5, the telescopic rod 9.

Said telescopic rod is provided, at an end portion thereof, with a hub 18, on which said guide bearing 8 is assembled.

The latter will be driven in a groove of the cam 7, through the overall perimeter of the bottom portion 12 of the mirror 1.

The head 20, to which said brush 11 supporting arm 15 is coupled, is tangentially and progressively driven along the outer edge of the surface 12.

Thus, the brush 11, by performing a circular eccentric movement about the crossing point of the surface 12 diagonals, of the bottom portion of the mirror 1, will progressively and fully clean the mirror.

As shown, the head 20 of the telescopic rod 9 is provided, on a peripheral portion thereof, with a rack 19, including a plurality of tooth elements 21.

Along the top portion of its path, the head 20 of the telescopic rod 9 engages with a channel 22, the bottom edges of which delimit, at the top thereof, the bottom portion 12 of the mirror 1, whereas the top edges thereof delimit, at the bottom, the top surface 23 of the mirror 1 which, preferably, has geometric-optical characteristics different from those of the portion 12 of the mirror 1.

At the top portion of the channel 21, the tooth elements 21 of the rack 19 engage with the tooth elements 24 of the half-toothed gear wheel 25, for a portion thereof corresponding to the length of the head 20.

At said portion, a rotary movement of the rack 19, will cause the half-toothed wheel 25 to turn, said half-toothed wheel 25 being devoid of teeth on a sector thereof.

The cleaning device further comprises a lug 36 which, by a fulcrum point 35, is coupled to the arm 26 to which the mirror cleaning brush 27 is coupled.

Thus, as the wheel 35 is rotatively driven, it will in turn drive the cleaning brush 27 so as to energize the coil spring 28.

As shown, said coil spring 28 is housed in an inner recess of the wheel 25, which is keyed on a cylindric hub 29, rigid with a rear frame 30.

Thus, with a continuous turning of the rack 19, it will be disengaged from the wheel 25 and the latter, in turn, after having brought the cleaning brush 27 to its end of stroke position, will disengage to recover its starting rest position, by a counter-rotating movement.

The return of the cleaning brush 27, in particular, is entrained by the force provided by the spring 28 being unloaded.

Thus, as the cleaning brush 27 is reciprocally driven, it will clean all the surface of the top portion 23 of the mirror.

Moreover, a continuous contact of the brush 27 on the surface of the top portion 23 of the mirror is provided by a spring 33, coupled to and operating on the lug 36 of the arm 26 and on the element 34 rigid herewith.

In particular, the disengagement of the cleaning brush from the surface 23 of the mirror, is assured by the fulcrum point 35 allowing an angular rotation of the arm 26 and lug 36.

The above mentioned rear frame 30 is coupled, by a coupling clamping element 31, of a metal flange type, engaging a supporting bar for supporting the rear mirror 32.

From the above disclosure it should be apparent that the invention fully achieves the intended aim and objects.

In particular, an outer rear mirror specifically designed for trucks and motor vehicles in general including an automatic clean device for cleaning it which is very reliable and safe in operation has been provided.

The invention, as disclosed, is susceptible to several modifications and variations, all of which will come within the scope of the invention.

Moreover, all of the constructional details can be replaced by other technically equivalent elements.

In practicing the invention, the used materials, as well as the contingent size and shapes, can be any depending on requirements.

What is claimed is:

1. An outer rear mirror for trucks and motor vehicles, including an automatic cleaning device, characterized in that said rear mirror comprises an electric motor rotatively driving a worm meshing with a gear wheel rigid with an elliptical cross-section element turning about a rotary shaft supporting a cam element, said cam element having a peripheral groove engaging therein a drive bearing coupled to a telescopic rod sliding in a hollow cylinder.

2. An outer rear mirror, according to claim 1, characterized in that said rear mirror comprises a top and a bottom mirror surface having different geometric-optic characteristics, and a rear frame including clamping means and metal flanges.

3. An outer rear mirror, according to claim 1, characterized in that said telescopic rod performs a rotary movement and has entrained therein a cleaning brush provided for contacting a portion of a surface of said rear mirror.

4. An outer rear mirror, according to claim 3, characterized in that said cleaning brush is held in contact with said surface of said mirror by a coil spring operating on an end portion of an arm supporting said cleaning brush.

5. An outer rear mirror, according to claim 4, characterized in that said arm is pivoted on a pivot pin and that said spring is coiled about a guide rod.

6. An outer rear mirror, according to claim 1, characterized in that said telescopic rod is provided with a hub rigid therewith theron a guide bearing is engaged.

7. An outer rear mirror, according to claim 1, characterized in that said electric motor drives said worm meshing with said gear wheel rigid with said elliptical cross-section element being in turn rigid with said hollow cylinder housing and telescopic rod.

8. An outer rear mirror, according to claim 1, characterized in that said telescopic rod drives said bearing along a path defined by said cam element along an inner perimeter of said mirror surface.

9. An outer rear mirror, according to claim 1, characterized in that said telescopic rod is provided with a head forming an attachment point for said cleaning brush supporting arm.

10. An outer rear mirror, according to claim 1, characterized in that said telescopic rod supports a rack designed for tangentially turning with respect to an outer edge of the bottom portion of said mirror as said telescopic rod is rotatively driven.

11. An outer rear mirror, according to claim 1, characterized in that said cleaning brush performs a rotary elliptic movement about said bottom portion of said mirror, thereby progressively and fully cleaning said bottom portion of said mirror.

12. An outer rear mirror, according to claim 1, characterized in that said telescopic rod gas an end portion thereof provided with said rack, said rack including a plurality of rack tooth elements.

13. An outer rear mirror, according to claim 12, characterized in that end portion of said telescopic rod engages a channel element including bottom edges delimiting said surface of said bottom portion of said mirror, said channel having top edges delimiting, at the bottom thereof, a surface of a top portion of said mirror, which has geometric-optic characteristics different from those of said surface of said bottom portion of said mirror.

14. An outer rear mirror, according to claim 13, characterized in that a portion of said channel, the tooth elements of said rack engage with corresponding tooth elements of a half-toothed gear wheel for a portion thereof corresponding to the length of said rack, thereby causing said half-toothed wheel to turn.

15. An outer rear mirror, according to claim 14, characterized in that as said rack disengages from said half-toothed wheel, said half-toothed wheel, after having brought said cleaning brush to an end of stroke position, is disengaged to return to its starting rest position, by a counter-turning movement under the force of said spring being unloaded.

16. An outer rear mirror, according to claim characterized in that said cleaning brush is designed for cleaning all of the surface of the top portion of said mirror.

17. An outer rear mirror, according to claim 15, characterized in that said spring is coupled to and operates on said lug of said arm and on an element rigid therewith.

18. An outer rear mirror, according to claim 14, characterized in that said half-toothed gear wheel is devoid of teeth on a top sector thereof, in said sector a lug being provided which, through a fulcrum element is coupled to an arm in turn coupled to said mirror cleaning brush.

19. An outer rear mirror, according to claim 14, characterized in that said half-toothed wheel and cleaning brush are rotatively driven by said rack of said telescopic rod only for a portion of engagement of said rack with said half-toothed wheel.

20. An outer rear mirror, according to claim 14, characterized in that said half-toothed wheel rotatively drives said cleaning brush as said half-toothed wheel is rotatively driven by said telescopic rod rack.

21. An outer rear mirror, according to claim 1, characterized in that said spring is engaged in a recess of said wheel and that said wheel is keyed on a cylindric hub rigid with said rear frame.

22. An outer rear mirror, according to claim 1, characterized in that said rear frame is coupled by clamping flanged means engaging a mirror supporting bar.

* * * * *

UNITED STATES PATENT AND TRADEMARK OFFICE
CERTIFICATE OF CORRECTION

PATENT NO. : 6,760,950 B2
DATED : July 13, 2004
INVENTOR(S) : Lazzari

It is certified that error appears in the above-identified patent and that said Letters Patent is hereby corrected as shown below:

Title page,
Item [75], Inventor, the correct residence for the inventor is -- Cusano Milanino, Italy --.

Signed and Sealed this

Twentieth Day of September, 2005

JON W. DUDAS
*Director of the United States Patent and Trademark Office*